Dec. 23, 1941.                S. S. MATTHES                2,267,621
                         ELECTRIC SWITCHING SYSTEM
                            Filed April 1, 1936
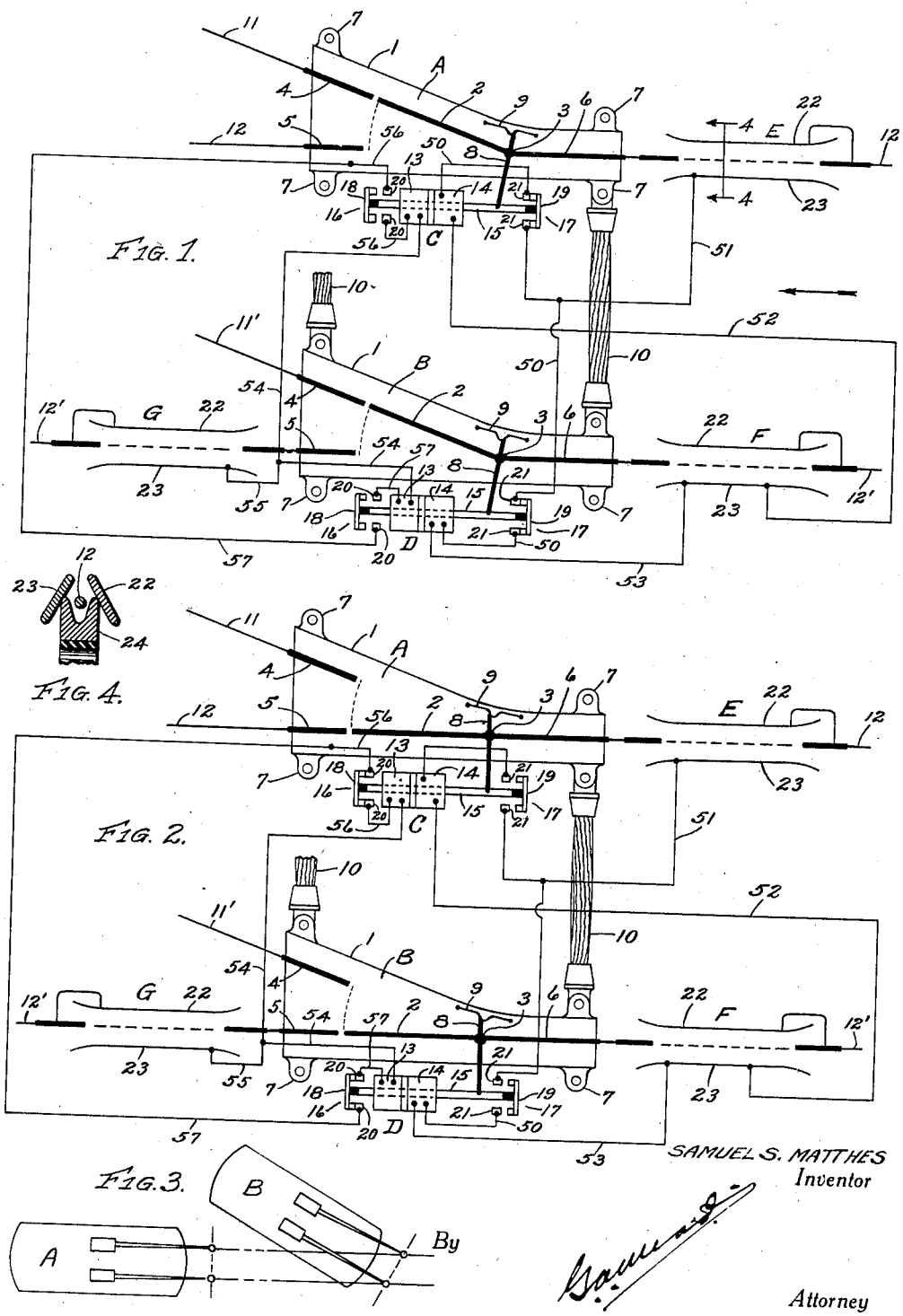
SAMUEL S. MATTHES
Inventor
By
Attorney Patented Dec. 23, 1941

2,267,621

UNITED STATES PATENT OFFICE 2,267,621

ELECTRIC SWITCHING SYSTEM

Samuel S. Matthes, Mansfield, Ohio, assignor to The Ohio Brass Company, Mansfield, Ohio, a corporation of New Jersey Application April 1, 1936, Serial No. 72,067

11 Claims. (Cl. 191—38)

My invention relates to electrically operated frogs or switches for use in overhead trolley systems.

In trolley bus operation it is customary to use two overhead trolley wires of opposite polarity as the buses are invariable mounted upon rubber tires thus insulating them from the ground and hence a grounded negative will not be used as in the case of street car operation.

At turnout or switching points, trolley frogs or switches are employed and these are usually arranged with positive means for conducting the trolley head through the switch.

In trolley bus operation, the bus is free to either follow along directly under the trolley wires or to swing laterally and travel along the wires parallel thereto but to one side. This requires the trolley head when equipped with a grooved current collector to swivel or pivot relative to the trolley pole as shown in U. S. Patent 1,893,383, issued January 3, 1933.

The trolley switch being arranged to positively guide the current collector or trolley head through the switch in the direction required, it becomes necessary to provide means for changing the guide means across the switch as required.

In my invention I employ electrically operated means for controlling the movement of the switch guide and I also employ contactors to be engaged by the current collectors before and after the collectors have crossed the switch to control the operation of the means for electrically operating the switches.

I also make use of the ability of the bus to change its direction of travel with respect to the trolley wires at the point of turnout for controlling the operation of the means for electrically operating the switches.

My invention will be better understood by reference to the following description taken in conjunction with the accompanying drawing, and particularly pointed out in the claims.

In the drawing:

Fig. 1 is a schematic drawing of a switching arrangement showing the switches in their normal or predetermined position and shown as set for conducting the current collector through the switch from the main line to the branch line.

Fig. 2 is a schematic drawing of the same arrangement shown in Fig. 1 but in which the switches, through the medium of the means for electrically operating the switches, have been changed to conduct the current collector straight through the switch from the approaching to the leaving means.

Fig. 3A shows schematically the relation of a trolley bus and its current collectors to the trolley wire when it is passing straight through a switch from main to main, and Fig. 3B shows schematically the relation of the trolley bus and its current collectors to the trolley wire when the bus is turning out as would be the case in passing from the main trolleys to the branch trolleys. I make use of the relations shown in Figs. 3A and 3B in controlling the operation of the electrically operated switches.

Fig. 4 is a section on the line 4—4 of one of the contactors shown in Fig. 1.

In the preferred embodiment of my invention, I employ two switches or frogs A and B, each comprising a pan member 1, movable tongue or guide 2 pivotally mounted at 3, fixed guides 4, 5, 6 and supporting lugs 7, arm 8 so associated with the guide 2 as to operate the guide 2 when the arm 8 is moved and the spring latch 9 arranged to hold the guide 2 in either of its two positions.

The switches A and B are spaced apart and positioned at the proper point in the overhead trolley line construction and are preferably maintained in fixed spaced relation by means of insulating spreaders 10 secured to the inner lugs 7. The outer lugs 7 may have secured thereto supporting span wires for assisting in supporting and maintaining the switches in predetermined position.

Connected to the fixed guides 4 are the branch trolley wires 11 and 11' and attached to the fixed guides 5 and 6 are the main or thru trolley wires 12 and 12'. The main trolley wires will be of opposite polarity.

Associated with each frog or switch A and B is electrically operated mechanism C and D respectively. This mechanism is preferably mounted upon the pan 1 of the switch while it operates.

The operating mechanism comprises broadly a two-way solenoid operating switch which also moves the arm 8 to operate the guide 2 to either of its positions. The electrically operated mechanism comprises the coils 13 and 14, the plunger 15 acted upon by the coils when energized to be moved longitudinally, and the switches 16 and 17. Each switch comprises a bridging or connecting member 18 and 19 insulated from the plunger 15 and fixed contacts 20 and 21 respectively. In the drawing, the coil 13 is arranged to move the plunger 15 to the left thus operating the guide 2 to the branch position as shown in Fig. 1, and the coil 14 arranged to move the plunger to the right to operate the guide to the main line position as shown in Fig. 2.

The metallic bridging or connecting members 18 and 19 being connected to the plunger 15, are moved in a corresponding direction with the plunger such that when the plunger moves to the left the switches 16 are opened and the switches 17 closed, and when the plunger 15 is moved to the right the switches 16 are closed and the switches 17 are opened.

Associated with the thru trolley wires 12 and 12' are the contactors E and F respectively and associated with either one of the trolley wires and on the opposite side of the switch from the contactors E and F is a contactor G. Each contactor is shown as provided with side plates 22 and 23 to be engaged by a current collector 24 in crossing the contactor as shown in Fig. 4. One plate 22 is shown as permanently connected to the associated trolley wire, therefore, the plate 23 is energized only at such time as the current collector 24 engages both plates 22 and 23.

The contactors may be of other constructions than that which I have shown and the contactor G may be placed in the thru trolley wire 12 if desired and a simple change of the connections.

My invention is arranged for operation of the trolley bus in one direction as indicated by the arrow and it is arranged for the movable guide 2 to be normally in position to guide the current collector from the main wire to the branch wire. The contactors E and F are preferably placed quite close to their respective switches in order that the bus about to pass through the switch will be able to do so without a closely following bus engaging the contactors and changing the position of the switch guides after the first bus may have altered the position of the guides 2 and before it has passed the switch.

The various parts of my invention are so connected, as later detailed, that in order for an approaching bus to change the position of the guide arm 2 from that shown in Fig. 1, it will be necessary for both current collectors 24 to engage with the contactors E and F simultaneously, but a leaving trolley bus will automatically return the guide arm from that shown in Fig. 2 back to the position shown in Fig. 1 when the single contactor G is engaged by one of the current collectors on the bus.

I call the position "normal" to which the tongues are moved through engagement of a current collector with the contact device G that is, the position of the tongues before the contacts E and F were engaged by the collectors 24.

If a bus approaching the switch desires to make the turn, it will do so at some point prior to the current collectors entering the switch system and in making such turn the position of the trolley heads carrying the current collectors will be changed with respect to the trolley wire as compared with a bus intending to go straight through, and it will be noted in Fig. 3B that a line through the current collectors is obliquely disposed to the trolley wires with one contactor considerably ahead of the other when the bus makes a turnout, which is not true if the bus remains in line with the trolley wires, as shown in Fig. 3A. Therefore, if the operator turns his bus at a predetermined point, the contactors E and F will not be simultaneously engaged and, therefore, there will be no energizing of the coils 14 and hence no change in the position of the guide arms 2 from that shown in Fig. 1, and the bus will pass the switch and complete its turn without changing the position of the guides 2.

If, however, the trolley bus is to pass straight through the switches along the main trolley wires 12 and 12', then the collectors will maintain a position with respect to the trolley wires as that shown in Fig. 3A and the current collectors will simultaneously engage the two contactors E and F and the coils 14 will then be automatically energized thus moving the plungers 15 to the right and the guides 2 will be moved to the position shown in Fig. 2. After the bus has passed through the switches, the contactor G will be engaged by one of the collectors on the bus and the coils 13 will be automatically energized thus moving the plungers 15 to the left and return the guides 2 to their normal position as shown in Fig. 1.

It very often happens that in case of heavy traffic a bus is obliged to stop, and if at such time the collectors engaged both contactors E and F, or if one collector engages the contactor G, then current will be passing through the coils 13 or 14 continuously while such engagement takes place, and this will endanger the coils, therefore, I insert the switches 16 and 17 into the control circuits such that as soon as the coils have functioned to move the guides 2 to either position, the circuit through the coils 13 or 14, as the case may be, will be broken but will be completed through the other coils.

It will be noted that a common conductor 50 connects to both coils 14 passing through the switches 17 and this conductor 50 is connected through the conductor 51 to the normally dead plate 23 of the contactor E; that a conductor 52 connects one coil 14 to the normally dead plate 23 of the contactor F and the conductor 53 connects the other coil 14 to the same plate. Coil 14 of mechanism C is connected in parallel with coil 14 of mechanism D.

The coils 13 are connected together by the conductor 54 and the conductor 54 is connected to the normally dead plate 23 of the contactor G by the conductor 55; one coil 13 is connected directly to the trolley wire of opposite polarity from that associated with the contactor G through the conductor 56 which is shown as connected to the switch pan A and associated switch 16, and the other coil 13 is connected to the same trolley wire and pan A through the conductor 57 and its associated switch 16. Coils 13 of mechanisms C and D are connected in parallel.

Having described my invention, what I claim as new is covered by the following claims.

I claim:

1. An overhead switching system controllable by a double-collector vehicle having an ungrounded motor system for guiding the current collectors on the moving vehicle comprising a pair of spaced main trolley wires of opposite polarity and a branch wire from each main wire, a frog positioned at the junction of each branch and main wires, each frog provided with a tongue movable to the main line or branch line to guide the collector passing through the frog, electrically operated mechanism associated with each frog for actuating the tongue thereof, a contact device associated with each main wire and positioned adjacent the approach side of the frog, each contact device being electrically connected through a portion of each operating mechanism to the other contact device and each said contact device being so constructed and so located relative to the other as to be connected to its trolley wire by a passing vehicle collector and energize the operating mechanism only when both contacts are in engagement with both collectors at the same time to move the tongues, and means engaged by a collector adjacent the leaving side of one frog and connected through a second portion of each operating mechanism to energize the said portion of both mechanisms and move the tongues on both frogs to a predetermined or normal setting.

2. An overhead switching system controllable by a double-collector vehicle having an ungrounded motor system for guiding the current collectors on the moving vehicle comprising a pair of spaced main trolley wires of opposite polarity and a branch wire from each main wire, a trolley frog at the junction points of the wires, each frog provided with a tongue movable to the main line or branch line to guide the collector passing through the frog, electrically operated mechanism associated with each frog for actuating the tongue thereof, a contact device associated with each main wire and positioned adjacent the approach side of the frog, each contact device being electrically connected through a portion of each operating mechanism to the other contact device and each said contact device being so constructed and located relative to the other so as to be connected to its trolley wire by a passing vehicle collector and energize the operating mechanism only when both contactors are engaged by both collectors at the same time to move the tongues, and means engaged by a collector adjacent the leaving side of one frog and connected through a second portion of each operating mechanism to energize the said portion of both mechanisms and move the tongues on both frogs to a predetermined or normal setting and means to open the circuit through the first said portions when said portions have been energized and close the circuit through the second said portions.

3. An overhead switching system controllable by a double-collector vehicle having an ungrounded motor system for guiding the current collectors on the moving vehicle comprising a pair of spaced main trolley wires of opposite polarity and a branch wire from each main wire, a trolley frog positioned at the junction points of the wires and each frog provided with a tongue movable to the main line or branch line to guide the collector passing through the frog, electrically operated mechanism associated with each frog for actuating the tongue thereof, a contact device associated with each main wire and positioned on the approach side of the frog, each contact device being electrically connected through a portion of each operating mechanism to the other contact device and each said contact device being constructed and so positioned with respect to each other and to the trolley wires that both contact devices are each connected to its respective trolley wire by a passing collector to energize the operating mechanism to move the tongues to the position the collectors are to take through the frogs only when the direction of travel at the time the contacts are both engaged is that which the vehicle intends to take through the switching system, a contact device associated with one trolley wire on the leaving side of a frog and electrically connected through a second portion of each operating mechanism to the other trolley wire and arranged to be connected to its trolley wire by a passing collector to energize the operating mechanism and move the tongues to their normal position.

4. An overhead switching system controllable by a double-collector vehicle having an ungrounded motor system for guiding the current collectors on the moving vehicle comprising a pair of spaced main trolley wires of opposite polarity and branch wires, one from each main wire with a trolley frog positioned at each junction point of the wires and each frog provided with a tongue movable to the main line or branch line to guide the collector passing through the frog, electrically operated mechanism associated with each frog for actuating the tongue thereof, a contact device associated with each main wire and positioned on the approach side of the frog, each contact device being electrically connected through a portion of each operating mechanism to the other contact device and each said contact device being so constructed and positioned with respect to each other and to the trolley wires that both contact devices are each connected to its respective trolley wire by a passing collector to energize the operating mechanism to move the tongues to the position the collectors are to take through the frogs only when the direction of travel at the time the contacts are both engaged is that which the vehicle intends to take through the switching system, a contact device associated with one trolley wire on the leaving side of a frog and electrically connected through a second portion of each operating mechanism to the other trolley wire and arranged to be connected to its trolley wire by a passing collector to energize the operating mechanism and move the tongues to their normal position and means to open the circuit through one portion of the operating mechanism and simultaneously close the circuit through the other portion to prevent prolonged energization of either portion.

5. An overhead switching system controllable by a double-collector vehicle having an ungrounded motor system for guiding the current collectors on the moving vehicle comprising a pair of spaced main trolley wires of opposite polarity and branch wires, one from each main wire, a trolley frog positioned at the junction points of the wires and each frog provided with a tongue movable to the main line or branch line to guide the collector passing through the frog, electrically operated mechanism associated with each frog for actuating the tongue thereof, a contact device for each frog and arranged to be engaged by the collectors on the vehicle to connect each contact device to its wire, the contacts and a portion of each operating mechanism being so connected and positioned with respect to each other and to the trolley wires as to energize said portion only when both contact devices are in engagement with their respective collectors at one time to operate the tongues, a third contact device for one of the trolley wires to be engaged by a collector on the vehicle to connect the contact to its trolley wire, the last said contact device being so connected and arranged as to energize a second portion of each operating mechanism to move the tongues to their normal position and means to open the circuit through the first portion of each operating mechanism when both said first contact devices are engaged at the same time by the collectors and close the circuit when the tongues are in their normal position.

6. A switching system for current collectors on a moving vehicle comprising a pair of trolley wires of opposite polarity, a pair of current collectors on a vehicle, a trolley frog for each wire and each frog having a movable tongue for directing the path of travel of the collectors, a branch wire from each frog, a trolley contact device associated with each wire, electrically operated means associated with the frogs and arranged to be connected to the contact devices and energized only when the collectors on the vehicle engage both contact devices to automatically energize the operating means to change the positioning of the tongues only when the direction of travel of the vehicle at the time the collectors engage both contact devices is in the intended direction of travel of the current collectors through the frogs, means to automatically return the tongues to their former position when the collectors have passed the frogs and means to render the operating means inoperative until the collectors have passed the frogs.

7. In a switching system for a pair of current collectors mounted on a vehicle, a pair of main trolley wires of opposite polarity and a branch wire for each main wire, a trolley frog associated at each junction point of the main wire and the branch wire to guide a current collector on the vehicle in either of two directions, each frog provided with a movable tongue normally set to guide the current collectors from the main wire onto the branch wire, electrically operated mechanism for each frog and each mechanism provided with two operating coils for moving the tongues, a contact device for each main wire and so located relative to the other and so connected to one of the coils of each operating mechanism that the said coils will be automatically energized only when the vehicle takes a direction of travel substantially parallel to the main trolley wires at the time the collectors are in engagement with both contact devices to move the tongues to their main wire position to guide the collectors straight through the frogs and means operable after the collectors have passed through the frogs to automatically energize the other coil of each frog and return the tongue thereof to its normal position.

8. A switching system for a trolley bus provided with two current collectors comprising a pair of through trolley wires of opposite polarity, a branch wire for each through wire, a frog at the junction point for each through wire, each frog provided with a movable tongue to guide the current collectors either straight through the frogs or onto the branch wires, electrically operated mechanism to move the tongues, a contact device for each through wire and its frog and each device arranged and connected so that a portion of the operating mechanism will be automatically energized and the tongues moved from a predetermined position only when the contactors are both in engagement at the same time with their respective collectors, means arranged to be engaged by the collector and connected to another portion of the operating mechanism to return the tongues to their predetermined position after the collectors have passed the frogs and engaged the said means, and means electrically connected to the said portions of the operating mechanism and arranged to render that portion of the operating mechanism inoperative when it has been energized and remain inoperative until the other portion has been energized.

9. A switching system for a trolley bus provided with two current collectors comprising a pair of main trolley wires and a branch wire from each main wire and a frog for each main at the junction with the branch wire, each frog having a tongue movable to two positions to guide the current collectors in passing through the frogs, a contact device for each main wire and arranged to be engaged by the current collectors before passing through the frogs, electrically operated mechanism for the frogs to operate the tongues, the frogs and the contact devices being so constructed and positioned with respect to each other and to the trolley wires that the operating mechanism will be energized to move the tongues in one direction only when both contact devices are in engagement with the collectors on a passing bus at the same time and means to render the operating mechanism non-operable as soon as the tongues are operated and to remain non-operable until the operating mechanism is re-energized after the current collectors have passed the tongues, and means electrically connected to said operating mechanism to effect said re-energization of the operating mechanism after the current collectors have passed the tongues to move the tongues to the said other position and place the switch in condition to be again operated by an approaching bus.

10. In an overhead switching system, the combination of a pair of main trolley wires, a branch wire from each main wire, a trolley frog at each junction of main and branch wires, a tongue movable to either of two positions to guide the current collectors on a vehicle along the main wires or on to the branch wires, electrically operated mechanism associated with each frog to move the tongue thereof to either position when the operating mechanism is energized, contact devices associated with the main trolley wires in advance of the frogs to control the energization of the operating mechanisms, the contact devices being so positioned with respect to each other and to the trolley wires and so connected to the operating mechanisms that both operating mechanisms will be energized and actuated and the position of the tongues changed only when two contacts are in engagement with the collectors on a passing vehicle at the same time, means to prevent further energization and actuation of both operating mechanisms until the current collectors have passed beyond the tongues and the tongues returned to their former position, and normally open circuit means electrically connected to both operating mechanisms and arranged to be engaged by and energized by one of the said current collectors after passing the tongues to effect a re-energization of both operating mechanisms to move the tongues, each to its prior position, and restore the ability of the operating mechanism to be actuated by an approaching vehicle.

11. A switching system for current collectors on a moving bus comprising a pair of trolley wires of opposite polarity, a trolley frog for each wire and each frog having a movable tongue for directing the path of travel of the collectors, a branch wire from each frog, a trolley contact device associated with each wire, electrically operated means associated with the frogs and arranged to be connected to the contact devices and energized only when the collectors on the bus engage both contact devices to energize the operating means to change the position of the tongues only when the direction of travel of the bus at the time the collectors engage both contact devices is in the intended direction of travel of the current collectors through the frogs, and means electrically connected to the operating means to automatically return the tongues to their former position when the collectors have passed the frogs.

SAMUEL S. MATTHES.